Aug. 30, 1932.  C. J. CRAIG ET AL  1,874,908
MOTION PICTURE APPARATUS
Filed Jan. 18, 1929
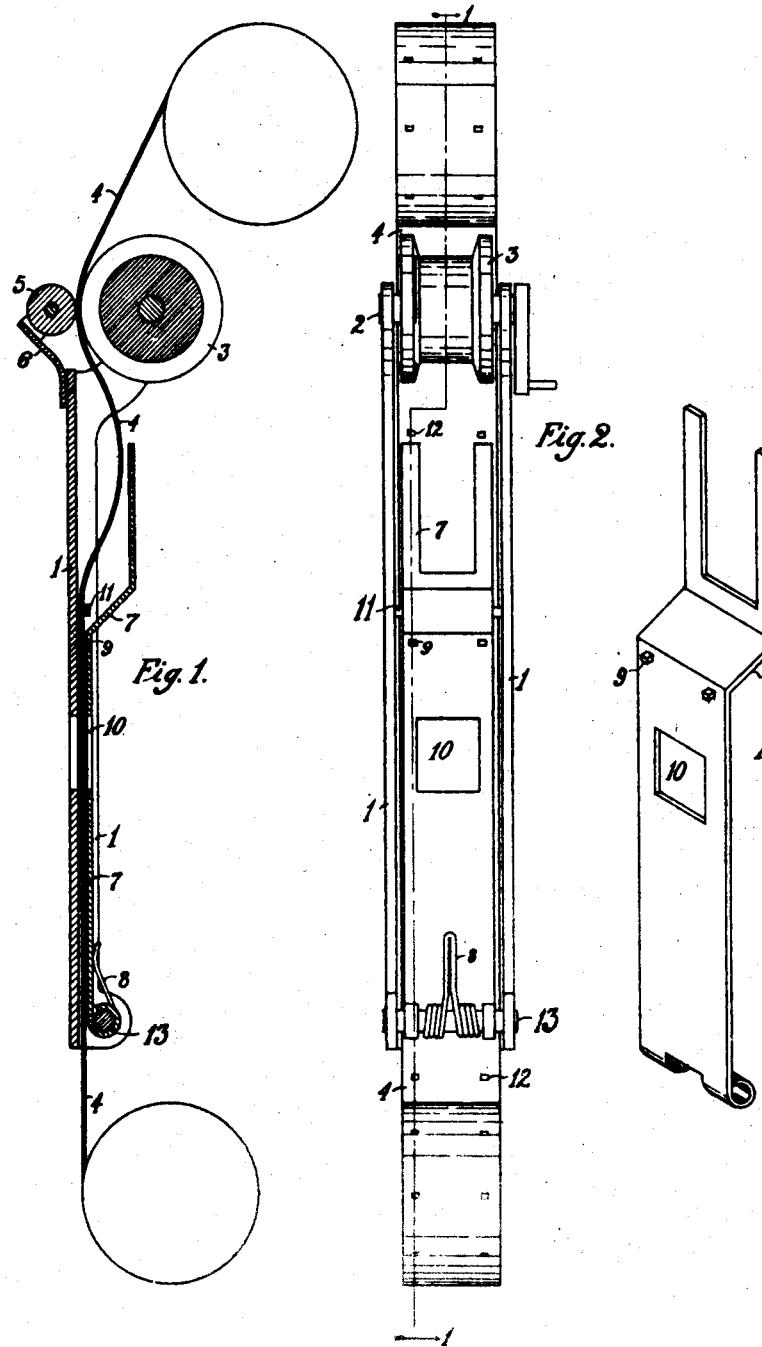
Inventors
Carl Jacob Craig and Jens Egede Nielsen Patented Aug. 30, 1932

1,874,908

UNITED STATES PATENT OFFICE

CARL JACOB CRAIG AND JENS EGEDE NIELSEN, OF CHICAGO, ILLINOIS; SAID CRAIG ASSIGNOR TO SAID NIELSEN

MOTION PICTURE APPARATUS

Application filed January 18, 1929. Serial No. 333,296.

Our invention relates to improvements in motion picture apparatus in which a film-feeding drum is propulsing a perforated film in conjunction with a guide and a pawl, producing an intermittent movement of the film. The objects of our improvement are, first, to simplify construction of motion picture apparatus; second, to reduce wear of film; third, to reduce flicker. We obtain these objects by the mechanism illustrated in accompanying drawing in which Figure 1 is a vertical section of the mechanism, Fig. 2, a rear view and Fig. 3 a detailed view in perspective of the pawl. Similar numerals refer to similar parts throughout the several views.

The guide 1 carries at one end a shaft 2 with feeding-drum 3, which may be driven by crank, belt or any suitable system of gearing, not a part of this invention. The film 4, which lengthwise has equal distant spaced perforations 12, is pressed against the feeding-drum 3, by the idler 5, which is held against the film 4, by the spring 6; this latter spring is again secured to the guide 1. To the opposite end of guide 1 is secured the shaft 13 carrying the pawl 7 which by the spring 8 is pressing against the film 4, in the guide 1. The pawl 7 has projecting stops 9 to engage in the perforations 12 in the film 4 and an aperture 10, to conform with images on the film 4. The bar 11 secured to the guide 1 serves to keep the film 4 in the guide when the stops 9 are disengaging with the perforations 12, in the film 4.

By turning the shaft 2, the feeding-drum 3 will propel the film 4 in the guide 1 till the stops 9, will engage with the perforations 12, in the film 4, which will by the spring operated pawl 7, be pressed firmly against the guide 1, with an image on the film in front of the aperture 10. By continuous drive of the drum 3, additional film will be propelled above the stops 9 and the film 4 will here take form of an arch, the rise of which will increase until the film 4 will come in contact with the upper end of the pawl 7. The pawl 7 will now, by the increasing loop formed in the film, be pushed in direction away from the guide 1, thereby disengaging the stops 9 from the perforations 12 in the film 4. The spring action of the arched film will now, as it straightens out, propel the part of the film 4 below the stops 9 at a high rate of speed; the spring operated pawl 7 will fall back against the guide 1 and engage in the next set of perforations. This intermittent movement will now repeat itself as long as the shaft 2 is turned. The part of the pawl 7, which is communicating with the arch formed in the film 4, is bent away from the guide 1 and accurately adjusted to time its motion with the stops 9, falling into the next set of perforations. This part of the pawl 7, is as well given such a suitable shape, that contact between the film and the pawl will only take place near the edges of the film, thereby preventing scratching of images on film. The feeding-drum 3 may be a sprocket-wheel, but we prefer to carry out this feature as a friction-drum with two flanges projecting from drum, each to bear on film near the opposite edges, thereby preventing scratching of image on film.

We are aware that prior to our invention moving picture apparatus have been made with an intermittent motion of film. We, therefore, do not claim such a combination broadly; but

We claim:

1. In a motion picture apparatus the combination of a film guide having an exposure aperture therein, a spring pressed pawl overlying said guide and having teeth for engaging the sprocket apertures of the film, said pawl having an outwardly bent portion projecting beyond the teeth in the direction of approaching film, means for continuously moving film toward said teeth whereby to cause it to bend outwardly toward said pawl portion and by engagement therewith periodically release the film from said teeth and cause intermittent movement of the film.

2. In a motion picture apparatus, the combination of means for continuously feeding the film in one direction, means spaced from the first named means in the direction of advance of the film for intermittently holding the film against advancing whereby to cause it to form a resilient loop between said feeding means and holding means, and means confining said loop yieldable under the pressure of said loop to release said holding means.

3. In a motion picture apparatus, the combination of means for continuously feeding the film in one direction, means spaced from the first named means in the direction of advance of the film for intermittently holding the film against advancing whereby to cause it to form a resilient loop between said feeding means and holding means, and means confining said loop yieldable under the pressure of said loop to release said holding means, said last named means including a holding pawl having a bifurcated end portion engaged by the film loop outwardly of of the sprocket holes therein to effect release of the pawl.

4. In a moving picture apparatus, a film guide, a film feeding device for continuously moving the film along said guide, and a holding device spaced from the feeding device and having a portion cooperating with said guide to hold the film against movement whereby to form a film loop between said feeding device and said holding device, and a movable loop confining element operatively connected to said holding device to cause it to release the film when the film pressure on said element exceeds a predetermined amount.

5. In a motion picture apparatus, the combination of a film guide having an exposure aperture therein with a spring pressed pawl overlying said guide and cooperating therewith to prevent movement of the film, said pawl having an outwardly offset portion projecting in the direction of approaching film, means for continually advancing the film whereby to form a loop therein between said offset portion and the guide, the pressure of the loop upon said portion causing it to releasing the film holding pawl and permit movement of the film.

CARL JACOB CRAIG.
JENS EGEDE NIELSEN.